US010773878B2

(12) United States Patent
Platusich

(10) Patent No.: US 10,773,878 B2
(45) Date of Patent: Sep. 15, 2020

(54) FREE FLOW COLLAR FOR CONTROL VALVES

(71) Applicant: Red Valve Company, Inc., Carnegie, PA (US)

(72) Inventor: Bruce M. Platusich, Lewisburg, PA (US)

(73) Assignee: Red Valve Company, Inc., Pittsburgh, PA (US)

( * ) Notice: Subject to any disclaimer, the term of this patent is extended or adjusted under 35 U.S.C. 154(b) by 236 days.

(21) Appl. No.: 15/751,024

(22) PCT Filed: Aug. 5, 2016

(86) PCT No.: PCT/US2016/045712
§ 371 (c)(1),
(2) Date: Feb. 7, 2018

(87) PCT Pub. No.: WO2017/027349
PCT Pub. Date: Feb. 16, 2017

(65) Prior Publication Data
US 2018/0229927 A1    Aug. 16, 2018

Related U.S. Application Data

(60) Provisional application No. 62/202,328, filed on Aug. 7, 2015.

(51) Int. Cl.
*F16K 11/06* (2006.01)
*B65D 88/70* (2006.01)
(Continued)

(52) U.S. Cl.
CPC .......... *B65D 88/706* (2013.01); *B65G 53/04* (2013.01); *B65G 53/52* (2013.01); *F16K 7/06* (2013.01); *F23J 3/06* (2013.01); *F23J 2700/001* (2013.01)

(58) Field of Classification Search
CPC .................................................... B65D 88/706
See application file for complete search history.

(56) References Cited

U.S. PATENT DOCUMENTS 2,430,278 A * 11/1947 Daniels .................. B01D 45/10
406/108
3,351,030 A * 11/1967 Albertson .............. C02F 11/12
110/221

(Continued)

FOREIGN PATENT DOCUMENTS

| JP | 10137656 A | 5/1998 |
| JP | 2012241971 A | 12/2012 |
| KR | 1020070076321 A | 7/2007 |

*Primary Examiner* — Nathaniel Herzfeld
(74) *Attorney, Agent, or Firm* — The Webb Law Firm

(57) ABSTRACT

An apparatus for distributing gases and, optionally, liquids into a control valve includes a collar and a plurality of gas distribution devices. The collar includes a first side, a second side opposite the first side, an inner bore formed through a central portion of the first side and the second side, an outer edge positioned between the first side and the second side and which defines an outer perimeter of the collar, an inner edge positioned between the first side and the second side and which extends around the inner bore to define an inside perimeter of the collar, and a plurality of passages that extend through the outer edge and inner edge without penetrating the first and second sides. The plurality of gas distribution devices are mounted into the passages of the collar.

23 Claims, 12 Drawing Sheets

(51) Int. Cl.
    *F16K 7/06*         (2006.01)
    *B65G 53/04*       (2006.01)
    *B65G 53/52*       (2006.01)
    *F23J 3/06*         (2006.01)

(56) References Cited

U.S. PATENT DOCUMENTS

| | | |
|---|---|---|
| 4,189,262 A | 2/1980 | Anderson |
| 4,390,281 A * | 6/1983 | Scriminger ............... B01F 3/12 366/3 |
| 4,587,989 A * | 5/1986 | Mayhew, Jr. ........ B65D 90/587 137/375 |
| 5,139,175 A | 8/1992 | Krysel et al. |
| 6,338,306 B1 | 1/2002 | Perrone |
| 8,387,398 B2 * | 3/2013 | Martin .................... F23N 1/002 60/772 |
| 8,469,059 B1 * | 6/2013 | Forst .................. F16K 11/0716 137/595 |
| 2007/0089419 A1 * | 4/2007 | Matsumoto ............... F23R 3/06 60/737 |
| 2009/0010720 A1 * | 1/2009 | Schwartz .................. F23J 3/06 406/144 |
| 2009/0084082 A1 | 4/2009 | Martin et al. |
| 2014/0079573 A1 * | 3/2014 | Pabst ....................... F04B 7/02 417/412 |

* cited by examiner

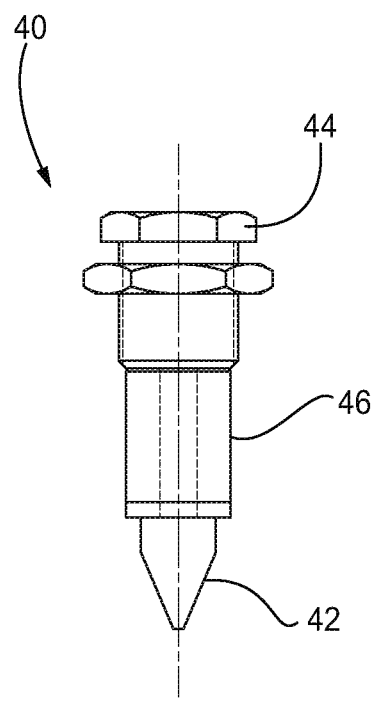
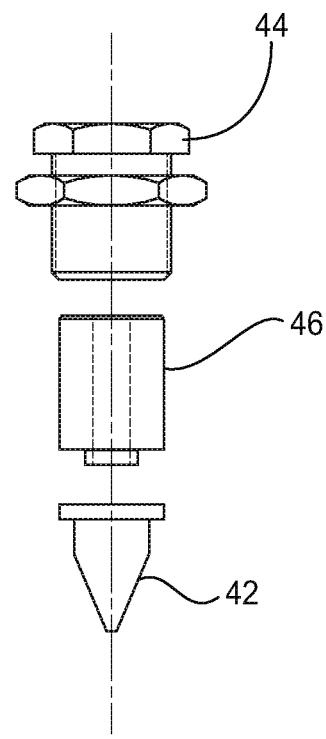
FIG. 4A  FIG. 4B
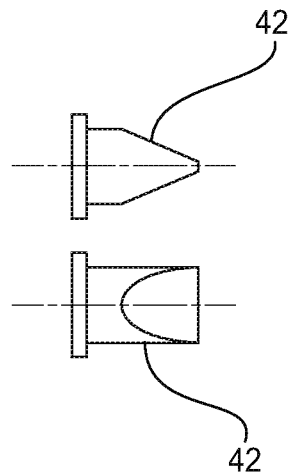
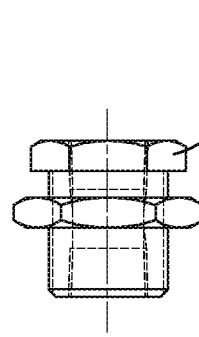
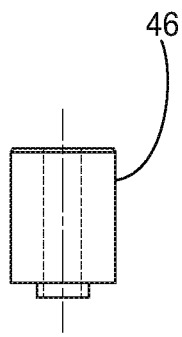
FIG. 4C  FIG. 4D  FIG. 4E

FREE FLOW COLLAR FOR CONTROL VALVES

CROSS REFERENCE TO RELATED APPLICATIONS

This application claims the benefit of U.S. Provisional Patent Application No. 62/202,328, filed Aug. 7, 2015, which is incorporated herein by reference in its entirety.

BACKGROUND OF THE INVENTION

Field of the Invention

The present invention is directed to an apparatus for controlling the flow of powder and/or liquid through a control valve, and, in particular, an apparatus and system for controlling and distributing liquid and/or residual products produced from combustion in control valves of pipelines and ducts.

Description of Related Art

Residual products produced from combustion are commonly referred to as fly ash or pulverized fuel ash. A large amount of fly ash is produced from the combustion of coal. The produced fly ash is typically collected into a hopper that is connected to a control valve. The fly ash is then emptied from the hopper through the control valve and re-used or disposed of in an environmentally acceptable manner.

While stored in the hopper, the powdered fly ash has a propensity to agglomerate together and build bridges in the various flow streams, which clogs the control valve. As a result of this clogging, the flow rate of the powdered fly ash through the valve becomes erratic and eventually stops. If the clog is broken, the fly ash self-fluidizes and runs uncontrollably, like water, through the system until another clog or small tunnel that limits flow (also referred to as a rat hole) forms, thereby causing the flow to stop either temporarily or until outside action is taken.

Various methods and devices have been developed to dislodge the clogging that occurs in the control valve. While current methods and devices help dislodge the clogging, there is a need for improved methods and devices that can efficiently dislodge clogging in a control valve. It is also desirable to provide a device that can be used to help control and distribute liquids as well as solids through a control valve.

SUMMARY OF THE INVENTION

In certain embodiments, the present invention is directed to an apparatus for distributing gases and, optionally, liquids. The apparatus includes a collar and a plurality of gas distribution devices. The collar comprises: a first side; a second side opposite the first side; an inner bore formed through a central portion of the first side and the second side; an outer edge positioned between the first side and the second side and which defines an outer perimeter around the collar; an inner edge positioned between the first side and the second side and which extends around the inner bore to define an inside perimeter of the collar; and a plurality of passages that extend through the outer edge and inner edge without penetrating the first and second sides. The plurality of gas distribution devices are mounted into the passages of the collar.

In some embodiments, the collar also includes one or more orifices formed through the first and second sides. The orifices are smaller in diameter than the inner bore and are positioned between the outer and inner edges of the collar.

Further, in some embodiments, the first side and the second side of the collar each independently have a flat even surface that extends between the inner and outer edges. The outer edge can also have a plurality of protrusions that are periodically spaced apart.

As indicated, the apparatus also includes a plurality of gas distribution devices. Each of the gas distribution devices can independently have an outlet end, an inlet end, and a body positioned between the inlet end and outlet end. The gas distribution devices are mounted into the passages of the collar such that the outlet ends are directed toward the inner bore. In some embodiments, at least a portion of the outlet ends of the gas distribution devices extend past the inner edge of the collar and into the inner bore, and/or at least a portion of the inlet ends of the gas distribution devices extend past the outer edge of the collar.

Moreover, in some embodiments, the gas distribution devices are oriented within the passages of the collar such that centerlines of at least some of the gas distribution devices are tangential to a circular path formed within the inner bore. The centerlines of the gas distribution devices positioned within the passages of the collar can also be coplanar or non-coplanar. In certain embodiments, the gas distribution devices are duckbill check valves.

The present invention is also directed to an assembly for preparing an apparatus for distributing gases or liquids. The assembly includes the previously-described collar and gas distribution devices that are configured to be mounted into the passages of the collar.

In addition, the present invention is further directed to a system for controlling and distributing a solid or liquid substance. The system includes a control valve and the previously-described apparatus. In some embodiments, the apparatus is in direct contact with the control valve. The system can also include a containment device for storing solid or liquid substances that is attached to the apparatus or the control valve through a conduit. Further, the system can include a gas or liquid source connected to the gas distribution devices.

In certain embodiments, the system includes at least two apparatuses with at least a first apparatus positioned at an inlet end of the control valve and at least a second apparatus positioned at an outlet end of the control valve. In some embodiments, a centerline of the inner bore is approximately coincident with a centerline of the control valve and a flow path extending through the centerline of the control valve.

BRIEF DESCRIPTION OF THE DRAWINGS

FIG. 4A is a side view of a gas distribution device according to the present invention;

FIG. 4B is a cut-away side view of a gas distribution device according to the present invention;

FIG. 4C are different views of an outlet end of a gas distribution device according to the present invention;

FIG. 4D is a side view of an inlet end of a gas distribution device according to the present invention;

FIG. 4E is a side view of a body portion of a gas distribution device according to the present invention;

DESCRIPTION OF THE INVENTION

Figure 1:
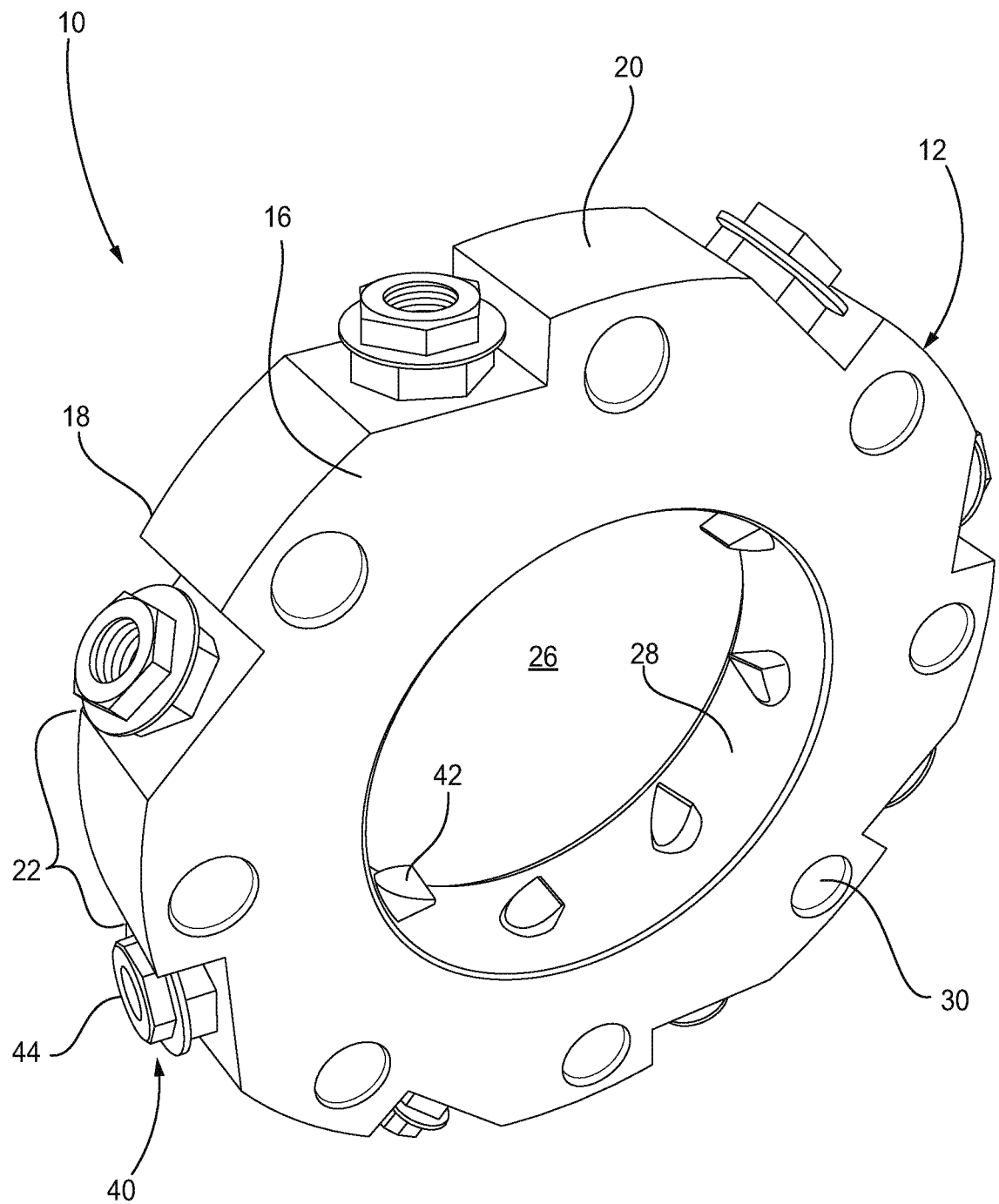
FIG. 1 is a perspective view of an apparatus comprising a collar with gas distribution devices mounted therein according to the present invention.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Further, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Figure 2:
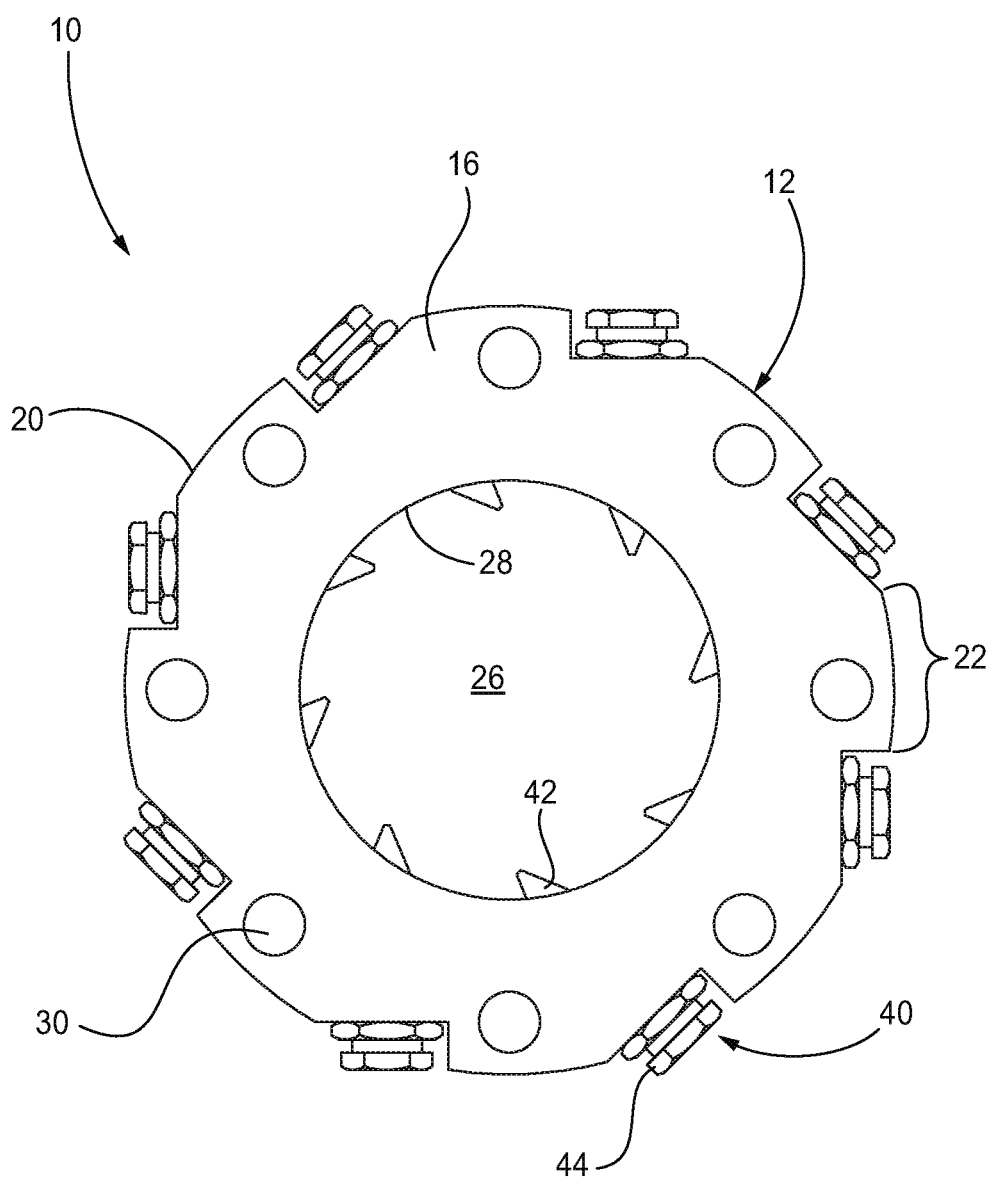
FIG. 2 is a top view of the apparatus shown in FIG. 1.
Figure 3:
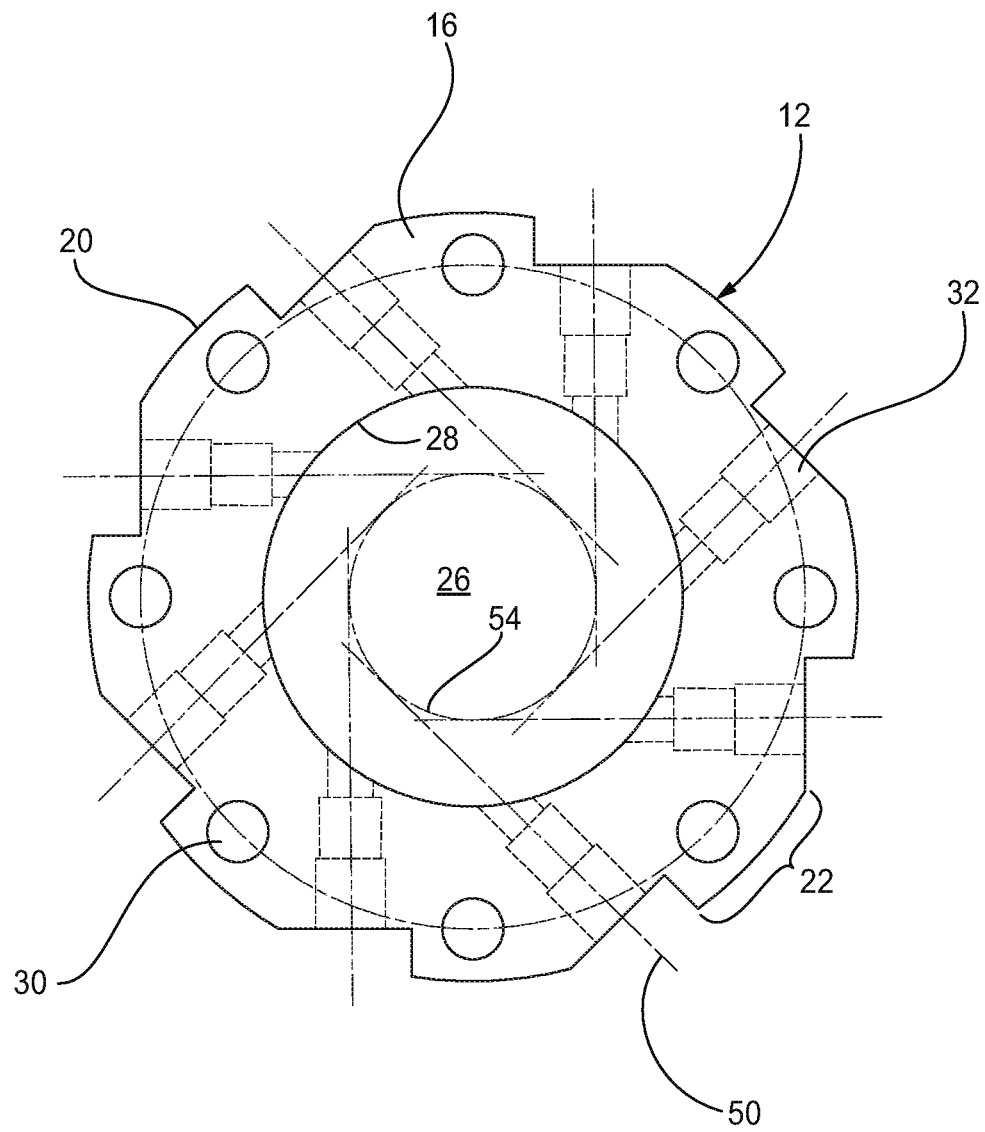
FIG. 3 is a top cross-sectional view of the collar shown in FIG. 1 without the gas distribution devices.

As indicated, the present invention is directed to an apparatus 10 for distributing gasses and, optionally, liquids. As shown in FIGS. 1-3, the apparatus 10 includes a collar 12 having a first side 16, a second side 18, and an outer edge 20 formed between the first and second sides 16, 18 and which defines the outer perimeter of the collar 12. In certain embodiments, the outer edge 20 of the collar 12 has a plurality of protrusions 22 that are periodically spaced apart from each other such that gaps are formed between each of the protrusions 22. In some embodiments, the outer edge 20 of the collar 12 is free of such protrusions 22 so that the collar 12 has a substantially smooth outer edge 20.

As shown in FIGS. 1-3, an inner bore or hole 26 is formed in a central portion of the collar 12 through the first and second sides 16, 18, As further shown in FIGS. 1-3, an inner edge 28 formed between the first and second sides 16, 18 of the collar 12 extends around the inner bore 26 and defines an inside perimeter of the collar 12. It is appreciated that the first and second sides 16, 18 of the collar 12 extend between the inner and outer edges 20, 28. In some embodiments, the first and second sides 16, 18 each have a flat and even surface that extends between the inner and outer edges 20, 28.

In certain embodiments, referring to FIGS. 1-3, the collar 12 further includes one or more orifices 30 that are formed through the first and second sides 16, 18 of the collar 12. The orifices 30 are smaller than the inner bore 26 and are positioned between the outer edge 20 and inner edge 28 of the collar 12. The orifices 30 are configured to receive a fastener that attaches the collar 12 to a separate device or component. Non-limiting examples of suitable fasteners include, but are not limited to, bolts, couplings, and combinations thereof. In some embodiments, the collar 12 includes a plurality of orifices 30 that can be attached to flanges found on the body of a pipe or duct.

As shown in FIG. 3, the collar 12 of the present invention also includes passages 32 that are positioned between the first and second sides 16, 18 and which extend through the outer edge 20 and inner edge 28 of the collar 12. Thus, the passages 32 form openings through the collar 12 that lead to the inner bore 26 without penetrating the first and second sides 16, 18. It is appreciated that the passages 32 do not intersect the previously-described orifices 30. Further, the passages 32 are configured to receive gas distribution devices 40. The passages 32 can be formed, for example, through a machining process, a molding process, and the like.

The collar 12 can have various shapes including, but not limited to, a circular or disc shape, a square shape, a rectangular shape, and the like. The shape and size of the collar 12 is selected based on the size and shape of a valve, pipe, duct, or other component the collar 12 will be attached to or associated with. The collar 12 can also be made from various materials, including, but not limited to, metal, plastic, rubber, other elastomeric materials, and combinations thereof. The materials of construction are determined by the temperature, corrosivity, and abrasiveness of the substances (e.g., the powder and conveying gas). In some embodiments, the collar 12 has a circular shape and is made of steel.

Referring to FIGS. 1 and 2, the apparatus 10 of the present invention also includes a plurality of gas distribution devices 40 mounted into the passages 32 of the collar 12 that are configured to distribute gases such as air, and, optionally, liquids as well. As shown in FIGS. 4A through 4E, each of the gas distribution devices 40 include an outlet end 42, an inlet end 44, and a body 46 positioned between the inlet end 44 and outlet end 42. Referring back to FIGS. 1 and 2, the gas distribution devices 40 are mounted into the passages 32 of the collar 12 such that the outlet ends 42 are directed toward to the inner bore or hole 26 so a gas such as air, and in some cases liquid, is distributed into the inner bore 26 during operation. The apparatus 10 of the present invention can include at least two, at least four, at least six, or at least eight gas distribution devices 40.

In certain embodiments, at least a portion of the body 46 of each gas distribution device 40 is positioned between the outside and inside perimeter of the collar 12. For example, and as shown in FIGS. 1 and 2, the entire body 46 of each gas distribution device can be positioned between the outer and inner edge 20, 28 of the collar 12. Further, in some embodiments, the outlet end 42 of at least one gas distribution device 40 extends out from the inner edge 28 of the collar 12, while the inlet end 44 extends out from the outer edge 20 of the collar 12. It is appreciated that the gas distribution devices 40 can also be mounted into the passages 32 such that the outlet end 42 of at least one gas distribution device 40 does not extend out from the inner edge 28 (i.e. is positioned between outer and inner edges 20, 28), such that the inlet end 44 of at least one gas distribution device 40 does not extend out from the outer edge 20 (i.e. is positioned between outer and inner edges 20, 28), or such that the outlet end 42 of at least one gas distribution device 40 does not extend out from the inner edge 28 and the inlet end 44 of the same gas distribution device 40 does not extend out from the outer edge 20.

When the outer edge 20 of the collar 12 includes the previously described protrusions 22, the gas distribution devices 40 can be mounted through the protrusions 22 and/or through the gaps positioned between the protrusions 22. For example, and as shown in FIGS. 1 and 2, the gas distribution devices 40 can be mounted into passages 32 formed through flat even surfaces of gaps positioned next to the protrusions 22 on the outer edge 20.

In certain embodiments, at least some of the gas distribution devices 40 are positioned at different angles to distribute air or other gases, and in some instances liquid, at different locations within the inner bore 26. For example, referring to FIG. 3, centerlines 50 formed by the passages 32 of the collar 12, and which correspond to the centerlines of the gas distribution devices 40 when positioned therein, are approximately tangential to a circular path 54 formed within the inner bore or hole 26 of the collar 10. In such embodiments, the gas distribution devices 40 can provide a swirling vortex within the inner bore 26 when air or other gasses are distributed through the gas distribution devices 40.

Moreover, in some embodiments, the gas distribution devices 40 are positioned on the same plane and are therefore coplanar to each other. Alternatively, at least some of the gas distribution devices 40 are positioned on different planes and are therefore non-coplanar to each other. As used herein, the term "coplanar" refers to at least two gas distribution devices 40 that direct air or other gases toward the same plane, and "non-coplanar" refers to at least two gas distribution devices 40 that direct air or other gases toward different planes.

It is appreciated that the orientation of the gas distribution devices 40 is determined by the passages 32 formed through the collar 12. As such, the passages 32 are formed within the collar 12 to receive and secure the gas distribution devices 40 in a particular position. The gas distribution devices 40 can be secured within the passages 32 so that the gas distribution devices 40 do not shift during operation of the apparatus 10.

Various types of gas distribution devices 40 can be mounted within the passages 32 of the collar 12 to distribute air or other gases into the inner bore 26. Typically, the gas distribution devices 40 used with the present invention are configured to distribute pressurized air (as well as other gases) while preventing backflow of particles and pressure. In certain embodiments, a pressurized air source is connected to the inlet end 44 of the gas distribution devices 40 such as with tubing for example. The tubing can include, but is not limited to, nylon tubing. Air can be distributed from the pressurized air source, into the inlet end 44, through the body 46, and out the outlet end 42 of each gas distribution device 40.

In some embodiments, the gas distribution devices 40 are also configured to distribute liquids. In such embodiments, a pressurized liquid source is connected to the inlet end 44 of the gas distribution devices 40 such as with tubing for example. Liquid can be distributed from the liquid source, into the inlet end 44, through the body 46, and out the outlet end 42 of each gas distribution device 40.

Figure 5:
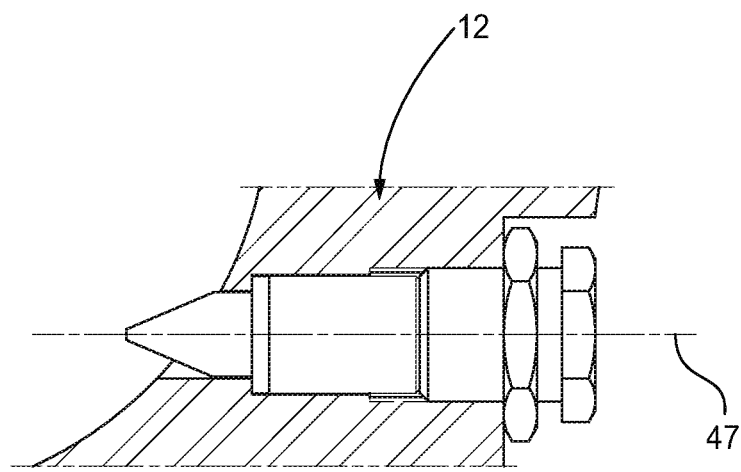
FIG. 5 is an exploded top cross-sectional view of a collar with a duckbill check valve mounted therein according to the present invention.
Figure 6:
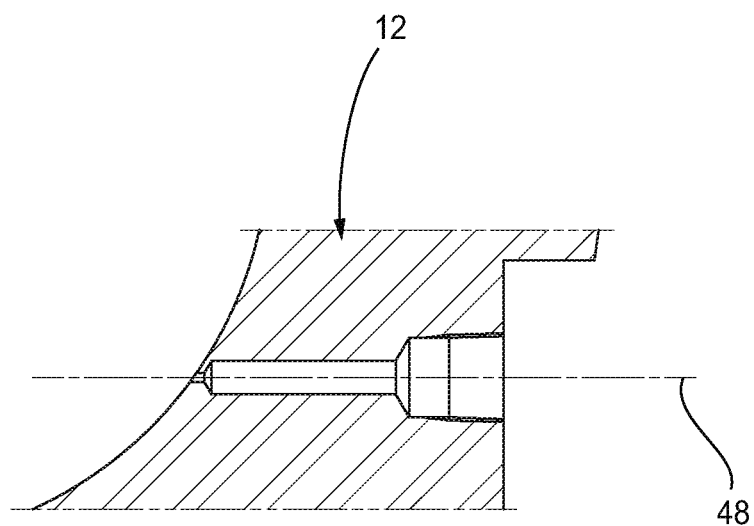
FIG. 6 is an exploded top cross-sectional view of a collar with a jet mounted therein according to the present invention.

Non-limiting examples of suitable gas distribution devices 40 include check valves and other devices that can distribute pressurized gases or liquid while preventing backflow of particles/liquid and pressure. Suitable check valves include, but are not limited to, duckbill check valves. As used herein, "duckbill check valves" refer to a check valve with an outlet end that tapers somewhat like the bill of a duck. During operation, gas or liquid flow drives the bill (outlet end) open while elastomeric spring forces, or reverse flow, drives the bill (outlet end) closed. It has been found that duckbill check valves are capable of distributing air or other gases into powders and then self-closing to prevent the powder from back-flowing and clogging the air or gas system. FIG. 5 illustrates an exploded top cross-sectional view of a collar 12 with a duckbill check valve 47 mounted therein. In systems using powders that are not prone to clogging the gas distribution devices 40, other gas distribution devices 40 can be used such as jets for example. FIG. 6 illustrates an exploded top cross-sectional view of a collar 12 with a jet 48 mounted therein.

The apparatus 10 described herein can be assembled at a manufacturing plant and sent directly to a different location. For example, the apparatus 10 described herein can be assembled at a manufacturing plant and sent directly to the site where the apparatus 10 will be used. Alternatively, the collar 12 and gas distribution devices 40 are provided as separate components and the apparatus 10 is assembled (i.e. the gas distribution devices 40 are mounted into the passages 32 of the collar 12) at a different location away from the manufacturing plant. Thus, in some embodiments, the present invention is directed to an assembly that includes: (i) the collar 12; and (ii) the gas distribution devices 40.

Figure 7:
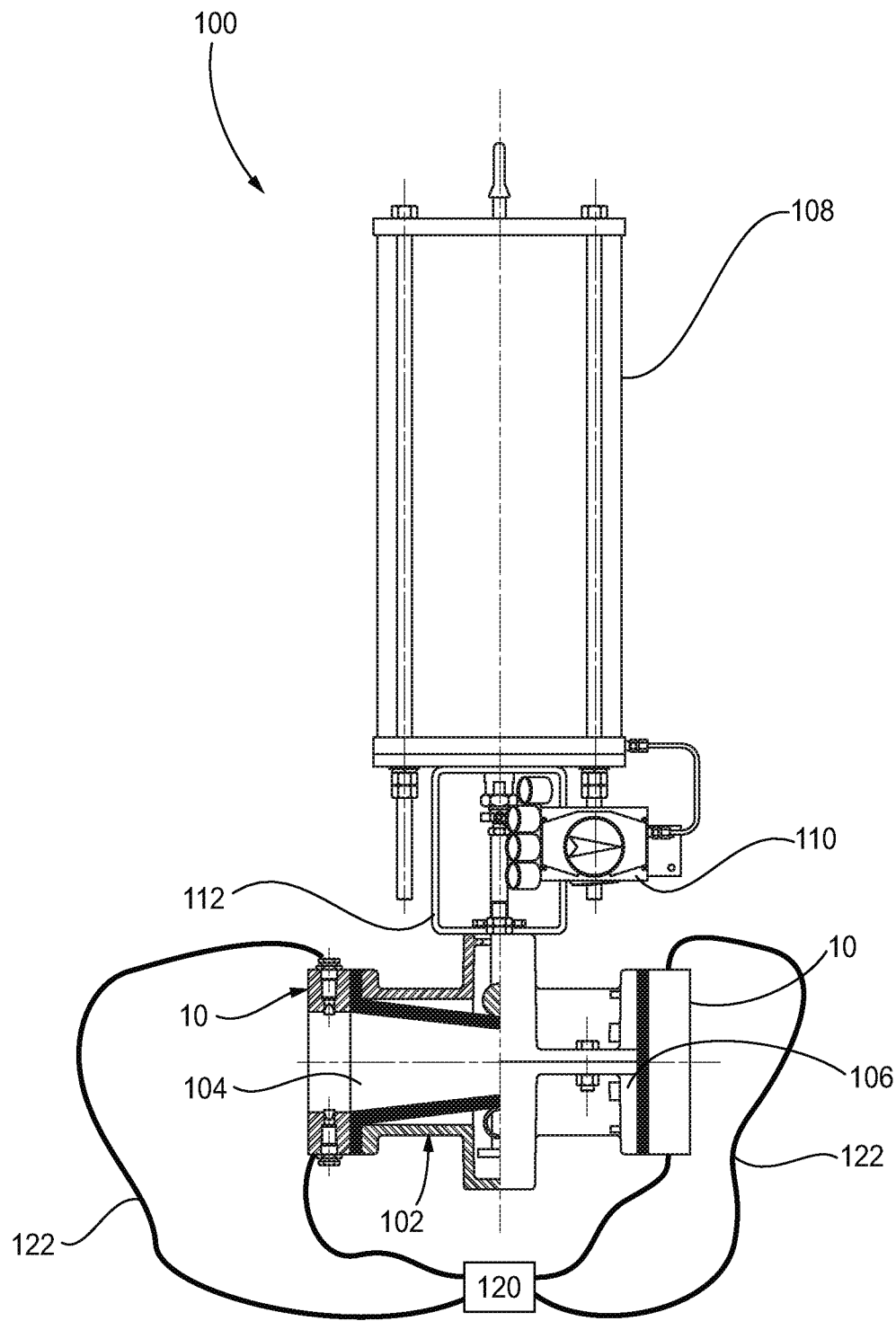
FIG. 7 is a partial cross-sectional side view of a control d apparatus according to the present invention.

As indicated, the present invention further includes a system 100 for controlling and distributing solids or liquids. Referring to FIG. 7, the system 100 includes the previously-described apparatus 10 and a control valve 102. Typically, systems for distributing residual products produced from combustion utilize large rotary valves to allow the powdered fly ash to flow properly. However, by using the apparatus 10 described herein, other control valves 102 can be used including, but not limited to, smaller and less expensive pinch valves as shown in FIG. 7. Other non-limiting examples of control valves 102 that can be used with the present invention include flange type valves and sleeve type valves.

Depending on the type of control valve 102 used, the system 100 may include other components to operate the control valve 102. For example, and as shown in FIG. 7, the system 100 can include an actuator 108 for operating the control valve 102, controls 110 for controlling the actuator 108, and a mounting bracket 112 that connects the actuator 108 to the control valve 102. Non-limiting examples of actuators 108 include motors, air cylinders, hydraulic devices, and the like.

As previously described, the gas distribution devices 40 are configured to distribute air or other gases into the inner bore 26. To provide air or other gases to the gas distribution devices 40, an air or gas source 120 is connected to the gas distribution devices 40 such as through tubing 122 as shown in FIG. 7. In some embodiments, the gas distribution devices 40 are also configured to distribute liquid into the inner bore 26. In such embodiments, a liquid source is connected to the gas distribution devices 40 such as through tubing. It is appreciated that at least some of the gas distribution devices 40 can be connected to a gas source 120, while the remaining gas distribution devices 40 can be connected to a liquid source. The pressurized gas or liquids may be timed so that the gases and/or liquids are released in predetermined bursts by individual or group control valves. These valves can include, but are not limited to, solenoid valves that are connected to a control device, such as a computer or other automatic controller for example. Sequencing the gas and/or liquid flow through the gas distribution devices 40 will reduce gas and liquid consumption.

The apparatus 10 of the present invention can be positioned at the inlet end 104 of the control valve 102 and/or at the outlet end 106 of the control valve 102. In some embodiments, as shown in FIG. 7, the apparatus 10 of the present invention is positioned at the inlet end 104 and the outlet end 106 of the control valve 102. Further, the apparatus 10, and in particular the collar 12, can be sized and shaped based on the size, shape, and/or type of control valve 102 as well as the intended positioning of the apparatus 10 relative to the control valve 102. In certain embodiments, the apparatus 10 is positioned directly next to the control valve 102 such that the apparatus 10 is in contact with and abuts at least a portion of the control valve 102. Alternatively, the apparatus 10 can be spaced apart from the control valve 102.

Figure 8:
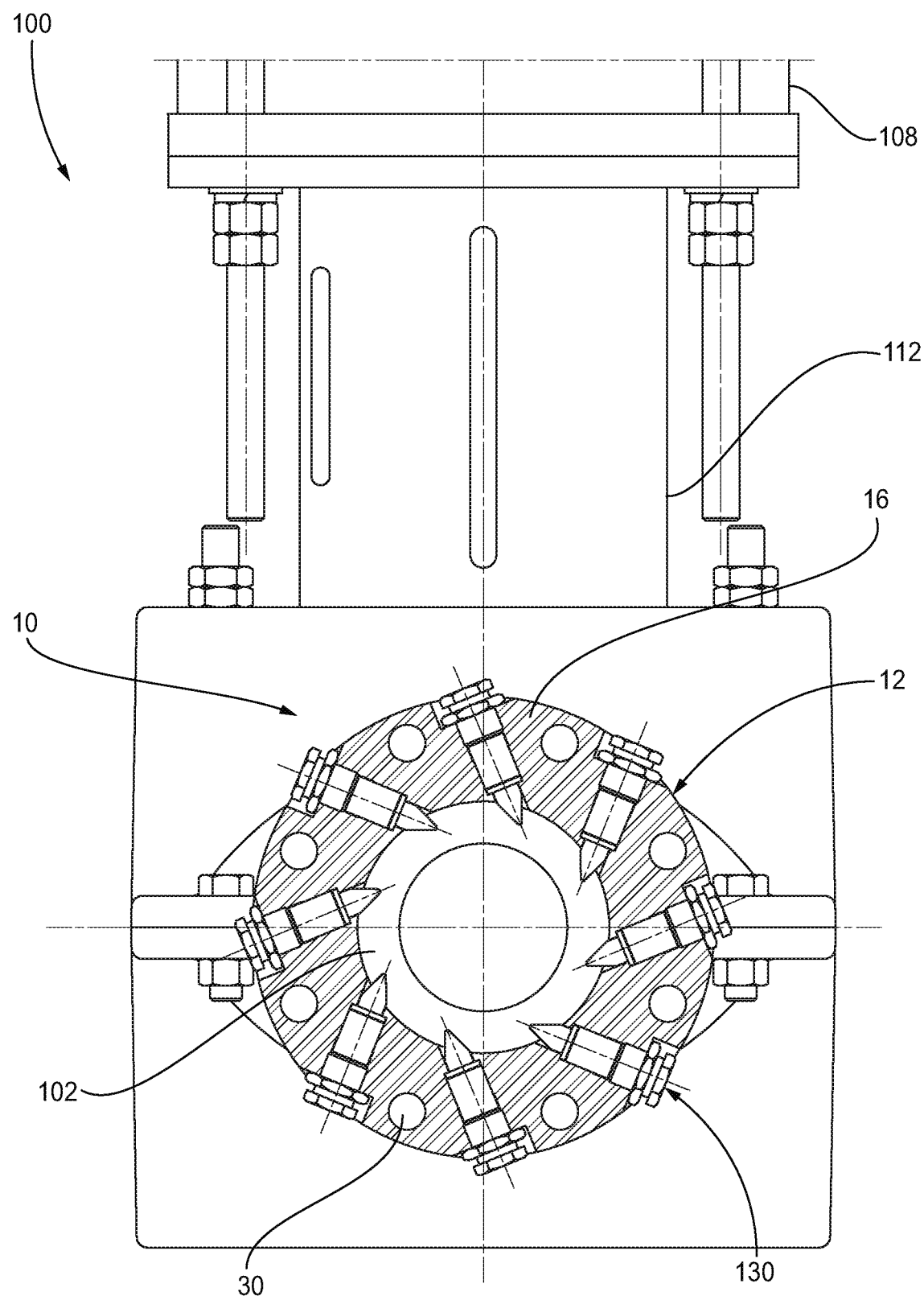
FIG. 8 is an exploded partial cross-sectional end view of the control valve and apparatus shown in FIG. 7.
Figure 10:
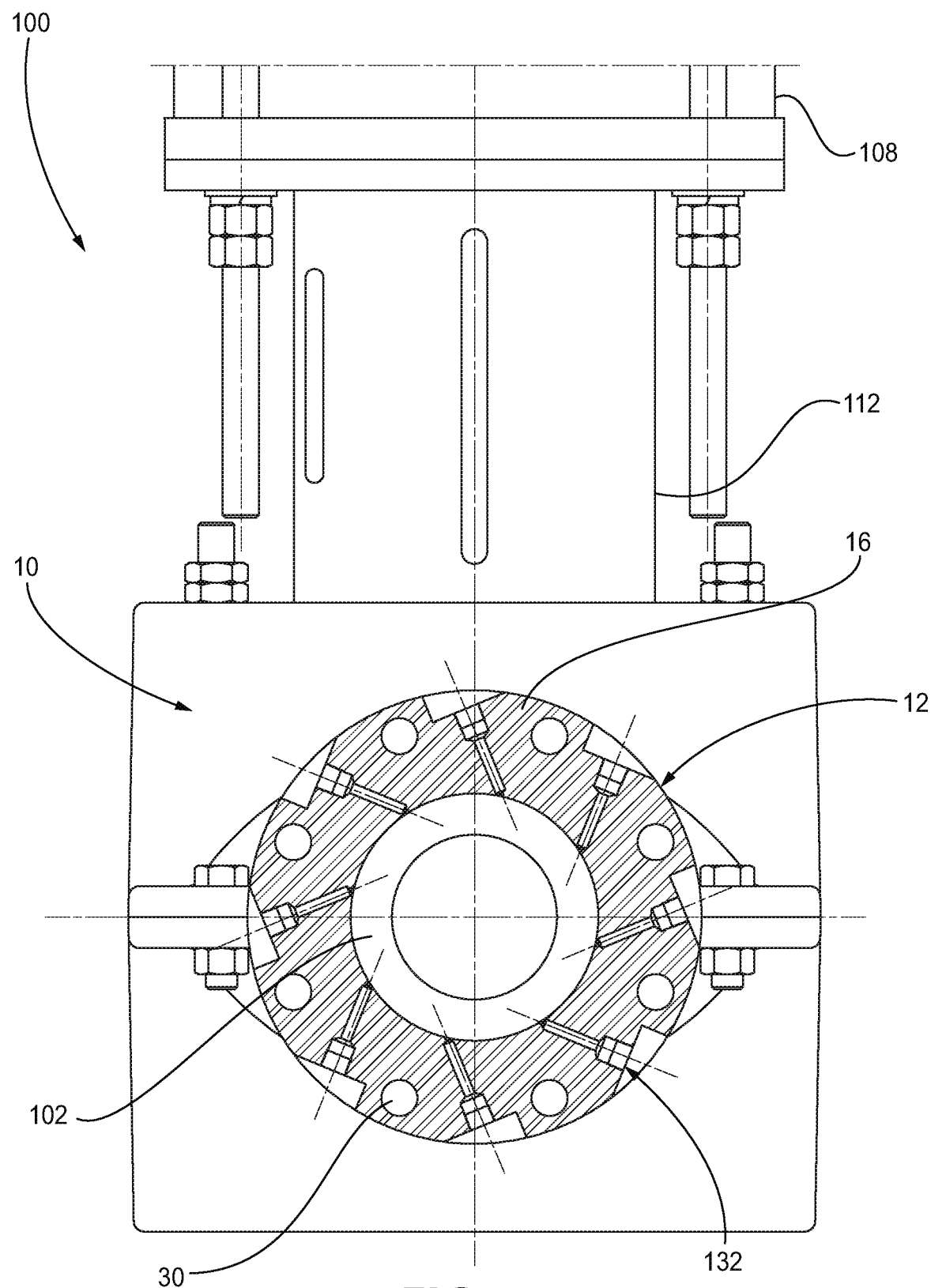
FIG. 10 is an exploded partial cross-sectional end view of a control valve and apparatus with a collar having jets according to the present invention.

In some embodiments, the inner bore 26 of the collar 12 is approximately the same size as the flow path leading to the control valve 102 as shown in FIGS. 8 and 10. As such, in some embodiments, the centerline of the inner bore 26 can be approximately coincident with the centerline of the control valve 102 and the flow path. As used herein, "coincident" refers to the alignment of the centerline of the inner bore 26 with the centerline of the control valve 102 and the flow path.

Figure 9:
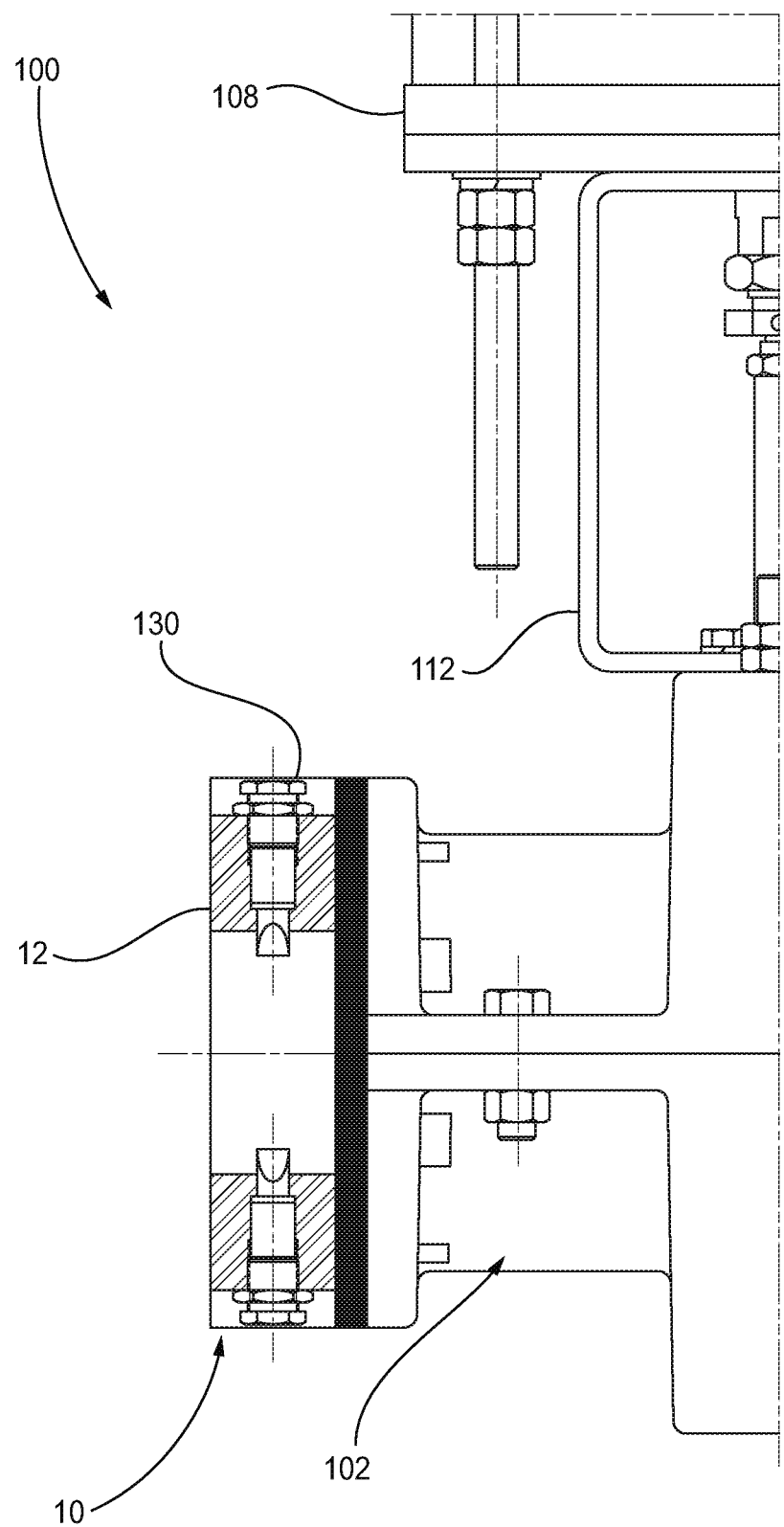
FIG. 9 is an exploded partial cross-sectional side view of the control valve and apparatus shown in FIG. 7.
Figure 11:
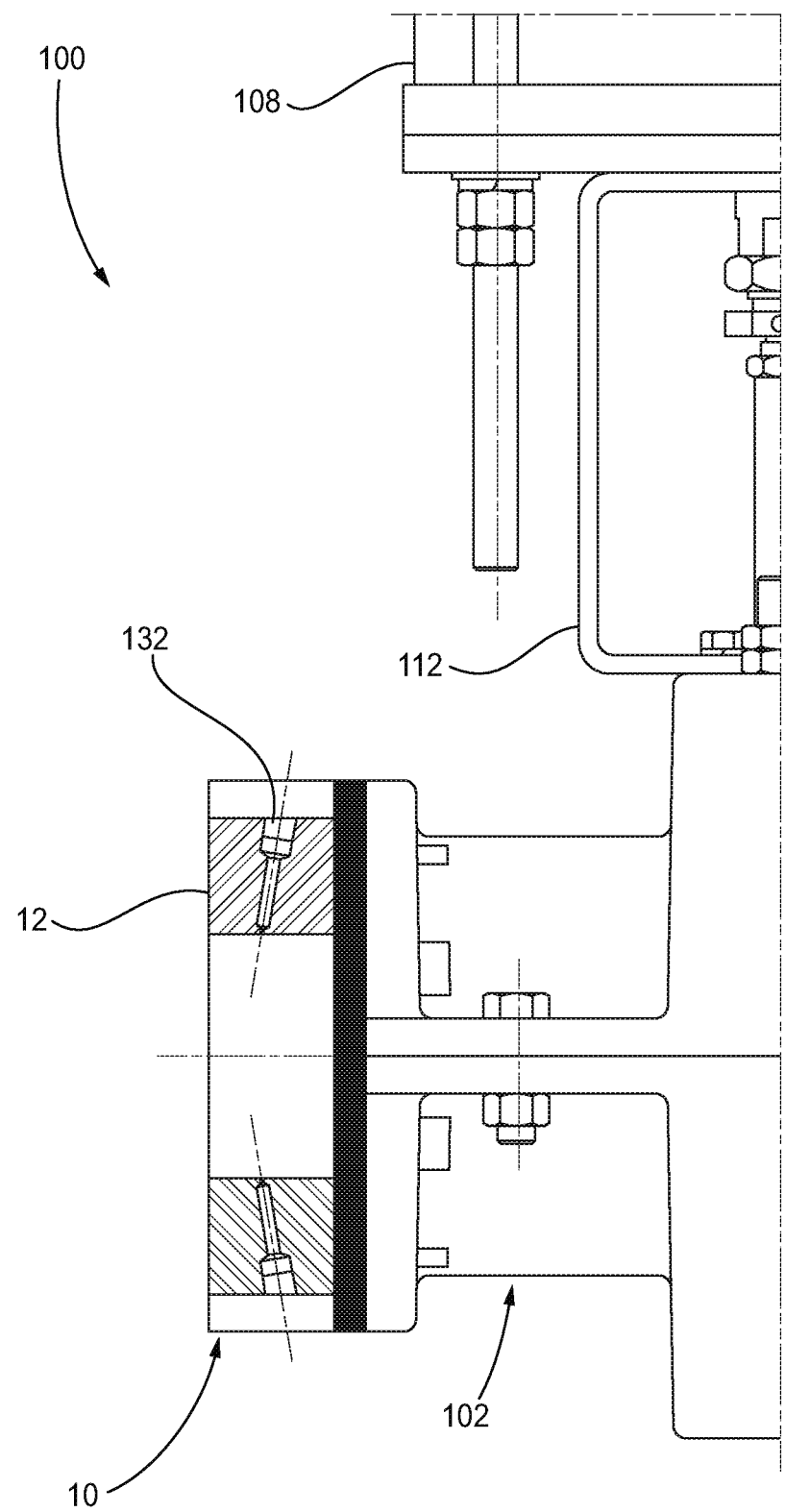
FIG. 11 is an exploded partial cross-sectional side view of the control valve and apparatus shown in FIG. 10 with the jets in a non-coplanar arrangement according to the present invention.

It is appreciated that any of the previously-described aspects of the collar 12 and gas distribution devices 40 of the present invention can be used with a control valve 102. For instance, the gas distribution devices 40 can include coplanar duckbill check valves 130, as shown in FIGS. 8 and 9. Alternatively, the gas distribution devices 40 can include non-coplanar gas distribution devices 40 such as non-coplanar jets 132, as shown in FIGS. 10 and 11. Further, the gas distribution devices 40 can also be positioned approximately tangential to a circular path 54 of the inner bore 26. The tangential configuration of the gas distribution devices 40 can produce a pattern and mixing action within the inner bore 26 that forms a random motion for effective agitation of powder. Thus, flow of powders having liquid like properties will be aided by having the gas distribution devices 40 oriented to produce a rotation of the powder, thereby capitalizing on the energy boost provided by Coriolis acceleration.

In certain embodiments, the apparatus 10 and control valve 102 are combined together as separate pieces on site such as at a plant to form at least a portion of the system 100. The apparatus 10 and control valve 102 can also be made as one unitary component. For example, the apparatus 10 can be formed to the control valve 102 through a welding or casting process.

Figure 12:
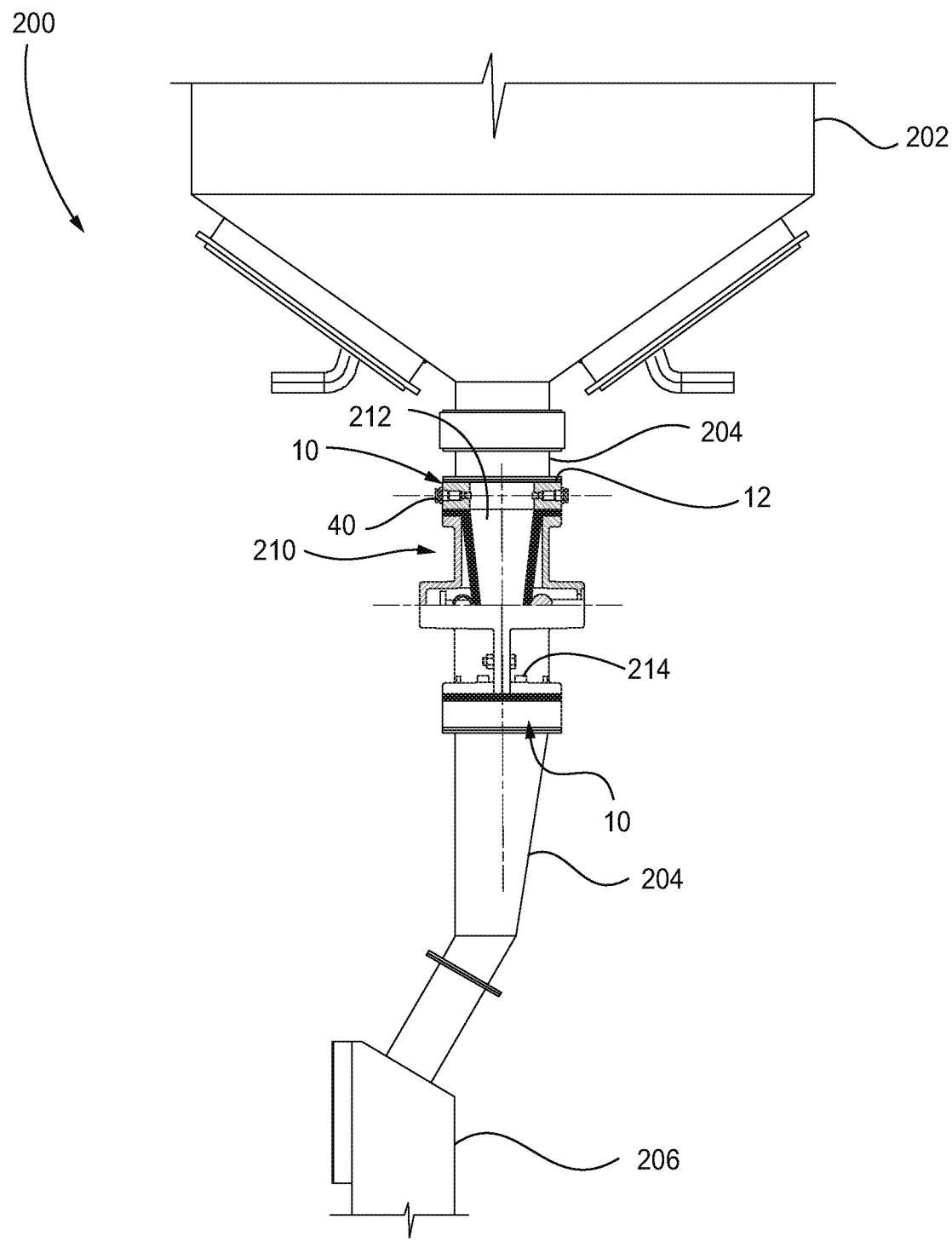
FIG. 12 is a perspective view of a system for controlling and distributing a solid or liquid substance according to the present invention.

In some embodiments, the system 200 of the present invention includes a hopper or other containment device that can store and distribute fly ash or other residual products produced from combustion. Referring to FIG. 12, the system 200 can include a hopper 202, conduits 204 for distributing the residual products, an apparatus 10 according to the present invention associated with a control valve 210, and an outlet 206. During operation of the system 200, air distributed through the gas distribution devices 40 will entrain the fly ash powder and cause the powder to become agitated and unpacked, allowing it to flow more freely and controllably. To ensure that powder is free flowing throughout the system 200, an apparatus 10 can be placed on the inlet 212 of the control valve 210 to prevent clogging of the inlet flow path, while a second apparatus 10 can be placed on the outlet 214 to break up the powder that has packed inside the control valve 210 when the control valve 210 has remained closed and the powder has again compacted itself. When the control valve 210 is open, the effect of the lower apparatus 10 will add to that of the apparatus 10 positioned at the inlet 212.

The system 200 can also include two or more apparatuses 10 positioned at the inlet 212 of the control valve 210 and/or two or more apparatuses 10 positioned at the outlet 214 of the control valve 210. The apparatuses 10 can be consecutively placed on top of each other or they can be spaced apart. The number of apparatuses 10 used with each control valve 210 can be determined by the powder being conveyed, the propensity of the powder to bridge and clog, and the shape of the flow path. By using the apparatus 10 described herein, the system 200 can provide a free flowing solid substance that is easily transported through a control valve 210.

While the apparatus 10 described herein can be used to break up powder in a control valve 210, it can also be used to break up pellets or other solid substances that tend to agglomerate and cause clogging. In addition, the apparatus 10 can also distribute liquids through the gas distribution devices 40 to control the flow of liquid based slurries that could settle out and pack, or harden. In some embodiments, the apparatus 10 can control abrasive slurries by using the jetted liquid, acting as a buffer layer between the downstream valve's walls and control surfaces and the abrasive slurry, in order to minimize wear.

In yet another application, the apparatus 10 can be used to reduce cavitation damage caused by fluid that was throttled by the control valve 210. For instance, a downstream apparatus 10 can be used to introduce liquids or air (or other gases) at elevated pressure into the flow stream, thereby introducing a controlled boundary layer of fluid to cause the cavitation vapor bubbles to collapse. The bubbles, which create damage when they collapse against system surfaces, internally collapse within the fluid stream. The extreme pressure and temperature pulse caused by the bubble's collapse would occur at some distance from a solid surface. The energy would, therefore, be absorbed by the fluid, thereby mitigating damage to the system and minimizing the noise that is created at the system walls and subsequently transmitted to the exterior of the system.

The present invention also includes the following clauses.

Clause 1: An apparatus for distributing gases and, optionally, liquids comprising: a collar comprising: a first side, a second side opposite the first side, an inner bore formed through a central portion of the first side and the second side, an outer edge positioned between the first side and the second side and which defines an outer perimeter of the collar, an inner edge positioned between the first side and the second side and which extends around the inner bore to define an inside perimeter of the collar, and a plurality of passages that extend through the outer edge and inner edge without penetrating the first and second sides; and a plurality of gas distribution devices mounted into the passages of the collar.

Clause 2: The apparatus of clause 1, wherein the collar further comprises one or more orifices formed through the first and second sides, wherein the orifices are smaller in diameter than the inner bore.

Clause 3: The apparatus of clauses 1 or 2, wherein the first side and the second side of the collar each independently have a flat even surface that extends between the inner and outer edges.

Clause 4: The apparatus of any of clauses 1-3, wherein the outer edge comprises a plurality of protrusions that are periodically spaced apart.

Clause 5: The apparatus of any of clauses 1-4, wherein each of the gas distribution devices independently comprise an outlet end, an inlet end, and a body positioned between the inlet end and outlet end, and wherein the gas distribution devices are mounted into the passages of the collar such that the outlet ends are directed toward the inner bore.

Clause 6: The apparatus of any of clauses 1-5, wherein at least a portion of the outlet ends of the gas distribution devices extend past the inner edge of the collar and into the inner bore.

Clause 7: The apparatus of any of clauses 1-6, wherein at least a portion of the inlet ends of the gas distribution devices extend past at least a portion of the outer edge of the collar.

Clause 8: The apparatus of any of clauses 1-7, wherein the gas distribution devices are oriented within the passages of the collar such that centerlines of at least some of the gas distribution devices are tangential to a circular path formed within the inner bore.

Clause 9: The apparatus of any of clauses 1-8, wherein the gas distribution devices positioned within the passages of the collar are coplanar.

Clause 10: The apparatus of any of clauses 1-8, wherein at least some of the gas distribution devices positioned within the passages of the collar are non-coplanar.

Clause 11: The apparatus of any of clauses 1-10, wherein the gas distribution devices comprise duckbill check valves.

Clause 12: An assembly for preparing an apparatus for distributing gases and, optionally, liquids into a control valve, said assembly comprising a collar comprising: a first side, a second side opposite the first side, an inner bore formed through a central portion of the first side and the second side, an outer edge positioned between the first side and the second side and which defines an outer perimeter of the collar, an inner edge positioned between the first side and the second side and which extends around the inner bore to define an inside perimeter of the collar, and a plurality of passages that extend through the outer edge and inner edge without penetrating the first and second sides; and a plurality of gas distribution devices configured to be mounted into the passages of the collar.

Clause 13: The assembly of clause 12, wherein the collar further comprises one or more orifices formed through the first and second sides, wherein the orifices are smaller in diameter than the inner bore.

Clause 14: The assembly of clauses 12 or 13, wherein the first side and the second side of the collar each independently have a flat even surface that extends between the inner and outer edges.

Clause 15: The assembly of any of clauses 12-14, wherein the outer edge comprises a plurality of protrusions that are periodically spaced apart.

Clause 16: The assembly of any of clauses 12-15, wherein the gas distribution devices comprise duckbill check valves.

Clause 17: A system for controlling and distributing a solid or liquid substance comprising a control valve and an apparatus, said apparatus comprising a collar comprising: a first side, a second side opposite the first side, an inner bore formed through a central portion of the first side and the second side, an outer edge positioned between the first side and the second side and which defines an outer perimeter of the collar, an inner edge positioned between the first side and the second side and which extends around the inner bore to define an inside perimeter of the collar, and a plurality of passages that extend through the outer edge and inner edge without penetrating the first and second sides; and a plurality of gas distribution devices mounted into the passages of the collar.

Clause 18: The system of clause 17, wherein the apparatus is in direct contact with the control valve.

Clause 19: The system of clauses 17 or 18, wherein the system comprises at least two apparatuses, and wherein at least a first apparatus is positioned at an inlet end of the control valve and at least a second apparatus is positioned at an outlet end of the control valve.

Clause 20: The system of any of clauses 17-19, wherein a centerline of the inner bore is approximately coincident with a centerline of the control valve and a flow path extending through the centerline of the control valve.

Clause 21: The system of any of clauses 17-20, further comprising a containment device for storing solid or liquid substances, wherein the containment device is attached to the apparatus or the control valve through a conduit.

Clause 22: The system of any of clauses 17-21, further comprising a gas or liquid source connected to the gas distribution devices.

Whereas particular embodiments of this invention have been described above for purposes of illustration, it will be evident to those skilled in the art that numerous variations of the details of the present invention may be made without departing from the invention as defined in the appended claims.

The invention claimed is:

1. An apparatus for distributing at least gases comprising:
   (a) a collar comprising:
      (i) a first side;
      (ii) a second side opposite the first side;
      (iii) an inner bore formed through a central portion of the first side and the second side;

(iv) an outer edge positioned between the first side and the second side and which defines an outer perimeter of the collar;
(v) an inner edge positioned between the first side and the second side and which extends around the inner bore to define an inside perimeter of the collar; and
(vi) a plurality of passages that extend through the outer edge and inner edge without penetrating the first and second sides; and (b) a plurality of gas distribution devices mounted into the passages of the collar, wherein the outer edge of the collar comprises a plurality of (1) protrusions and (2) gaps positioned between consecutive protrusions, the gaps comprising surfaces that the passages for the gas distribution devices are formed through, and wherein the gaps are positioned between the consecutive protrusions such that centerlines of all the gas distribution devices placed through the passages are oriented tangential to circular paths formed within the inner bore.

2. The apparatus of claim 1, wherein the collar further comprises one or more orifices formed through the first and second sides, wherein the orifices are smaller in diameter than the inner bore.

3. The apparatus of claim 1, wherein the first side and the second side of the collar each independently have a flat even surface that extends between the inner and outer edges.

4. The apparatus of claim 1, wherein the outer edge comprises a plurality of protrusions that are periodically spaced apart.

5. The apparatus of claim 1, wherein each of the gas distribution devices independently comprise an outlet end, an inlet end, and a body positioned between the inlet end and outlet end, and wherein the gas distribution devices are mounted into the passages of the collar such that the outlet ends are directed toward the inner bore.

6. The apparatus of claim 5, wherein at least a portion of the outlet ends of the gas distribution devices extend past the inner edge of the collar and into the inner bore.

7. The apparatus of claim 5, wherein at least a portion of the inlet ends of the gas distribution devices extend past at least a portion of the outer edge of the collar.

8. The apparatus of claim 1, wherein the gas distribution devices positioned within the passages of the collar are coplanar.

9. The apparatus of claim 1, wherein at least some of the gas distribution devices positioned within the passages of the collar are non-coplanar.

10. The apparatus of claim 1, wherein the gas distribution devices comprise duckbill check valves.

11. An assembly for preparing an apparatus for distributing at least gases into a control valve, said assembly comprising:
(a) a collar comprising:
(i) a first side;
(ii) a second side opposite the first side;
(iii) an inner bore formed through a central portion of the first side and the second side;
(iv) an outer edge positioned between the first side and the second side and which defines an outer perimeter of the collar;
(v) an inner edge positioned between the first side and the second side and which extends around the inner bore to define an inside perimeter of the collar; and
(vi) a plurality of passages that extend through the outer edge and inner edge without penetrating the first and second sides; and (b) a plurality of gas distribution devices configured to be mounted into the passages of the collar, wherein the outer edge of the collar comprises a plurality of (1) protrusions and (2) gaps positioned between consecutive protrusions, the gaps comprising surfaces that the passages for the gas distribution devices are formed through, and wherein the gaps are positioned between the consecutive protrusions such that centerlines of all the gas distribution devices placed through the passages are oriented tangential to circular paths formed within the inner bore.

12. The assembly of claim 11, wherein the collar further comprises one or more orifices formed through the first and second sides, wherein the orifices are smaller in diameter than the inner bore.

13. The assembly of claim 11, wherein the first side and the second side of the collar each independently have a flat even surface that extends between the inner and outer edges.

14. The assembly of claim 11, wherein the outer edge comprises a plurality of protrusions that are periodically spaced apart.

15. The assembly of claim 11, wherein the gas distribution devices comprise duckbill check valves.

16. A system for controlling and distributing a solid or liquid substance comprising a control valve and an apparatus, said apparatus comprising:
(a) a collar comprising:
(i) a first side;
(ii) a second side opposite the first side;
(iii) an inner bore formed through a central portion of the first side and the second side;
(iv) an outer edge positioned between the first side and the second side and which defines an outer perimeter of the collar;
(v) an inner edge positioned between the first side and the second side and which extends around the inner bore to define an inside perimeter of the collar; and
(vi) a plurality of passages that extend through the outer edge and inner edge without penetrating the first and second sides; and (b) a plurality of gas distribution devices mounted into the passages of the collar, wherein the outer edge of the collar comprises a plurality of (1) protrusions and (2) gaps positioned between consecutive protrusions, the gaps comprising surfaces that the passages for the gas distribution devices are formed through, and wherein the gaps are positioned between the consecutive protrusions such that centerlines of all the gas distribution devices placed through the passages are oriented tangential to circular paths formed within the inner bore.

17. The system of claim 16, wherein the apparatus is in direct contact with the control valve.

18. The system of claim 16, wherein the system comprises at least two apparatuses, and wherein at least a first apparatus is positioned at an inlet end of the control valve and at least a second apparatus is positioned at an outlet end of the control valve.

19. The system of claim 16, wherein a centerline of the inner bore is approximately coincident with a centerline of the control valve and a flow path extending through the centerline of the control valve.

20. The system of claim 16, further comprising a containment device for storing solid or liquid substances, wherein the containment device is attached to the apparatus or the control valve through a conduit.

21. The system of claim 16, further comprising a gas or liquid source connected to the gas distribution devices.

22. The apparatus of claim 1, wherein the gas distribution devices are configured to distribute a liquid.

23. The assembly of claim 11, wherein the gas distribution devices are configured to distribute a liquid.

* * * * *